(12) United States Patent
Park

(10) Patent No.: US 9,008,599 B2
(45) Date of Patent: Apr. 14, 2015

(54) METHOD AND APPARATUS FOR LISTENING TO RADIO IN PORTABLE TERMINAL

(71) Applicant: Samsung Electronics Co., Ltd., Gyeonggi-do (KR)

(72) Inventor: Doo-Yong Park, Gyeongsangbuk-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 13/910,378

(22) Filed: Jun. 5, 2013

(65) Prior Publication Data
US 2013/0324063 A1 Dec. 5, 2013

(30) Foreign Application Priority Data
Jun. 5, 2012 (KR) .................. 10-2012-0060200

(51) Int. Cl.
*H04B 17/00* (2006.01)
*H04B 1/06* (2006.01)
(52) U.S. Cl.
CPC ........................................ *H04B 1/06* (2013.01)
(58) Field of Classification Search
CPC ...... H03J 7/18; H03J 1/0091; H04B 17/0057; H04B 17/062

USPC .......... 455/226.2, 150.1, 151.1, 154.1, 160.1, 455/161.1–161.3, 179.1, 182.3, 226.1, 455/418–420
See application file for complete search history.

(56) References Cited

U.S. PATENT DOCUMENTS 6,289,207 B1* 9/2001 Hudecek et al. ............ 455/150.1
6,330,450 B1* 12/2001 Wallstedt et al. ............. 455/447
2010/0093343 A1* 4/2010 Qi et al. ..................... 455/432.1

FOREIGN PATENT DOCUMENTS

KR 10-2002-0064124 A 8/2002
KR 10-2011-0003118 A 1/2011
KR 10-2011-0052294 A 5/2011

* cited by examiner

*Primary Examiner* — Nhan Le
(74) *Attorney, Agent, or Firm* — Cha & Reiter, LLC.

(57) ABSTRACT

A method of listening to radio broadcast in a portable terminal includes reproducing radio broadcasts on a frequency selected by a user; determining a change in a value of a received signal strength indication (RSSI) of the selected frequency and analyzing a pattern of the change; and providing a complementary service based on the analyzed pattern when the radio broadcast over the selected frequency is not feasible.

14 Claims, 4 Drawing Sheets

METHOD AND APPARATUS FOR LISTENING TO RADIO IN PORTABLE TERMINAL

CLAIM OF PRIORITY

This application claims the benefit under 35 U.S.C. §119 (a) of a Korean Patent Application filed in the Korean Intellectual Property Office on Jun. 5, 2012, and assigned Serial No. 10-2012-0060200, the entire disclosure of which is incorporated herein by reference.

BACKGROUND

1. Field of the Invention

The present disclosure relates generally to portable terminals, and more particularly, to a method and apparatus for playing radio using a portable terminal.

2. Description of the Related Art

With many technology improvements in electronic devices, recent electronics are capable of providing various functions. For example, a portable terminal, such as a tablet or a smart phone provides various functions like a multimedia player, an e-book reader, a document editor, a game console, and the like. Further, a radio function is achieved by receiving broadcast signals via an antenna or by receiving live radio streams broadcast via an application.

However, in case of using the function of listening to radio via the antenna, if a received signal strength indication (RSSI) of the radio broadcast signal on the listening channel becomes weak, noise occurs from the listening radio broadcast signals which in turn prevents a normal radio service. For example, when the portable terminal is passing through a tunnel-like place where the RSSI becomes low, the terminal outputs noise instead of the music.

Especially, if the RSSI becomes lower while the radio is played at a loud speaker volume causing to output a louder noise, a user of the portable terminal and people around it would be uncomfortable.

Thus, there is a need for a solution to the problem of outputting noise due to the degradation of the RSSI when the portable terminal provides the radio listening function.

SUMMARY

The present invention provides embodiments of addressing the problem of outputting noise due to RSSI degradation when a portable terminal provides a radio listening function.

In accordance with an aspect of the present invention, a method of listening to radio in a portable terminal includes playing radio broadcasts on a frequency selected by a user; determining a change in a received signal strength indication (RSSI) level of the selected frequency and analyzing a pattern of the change; and providing a complementary service based on the analyzed pattern of the change when the radio broadcast over the selected frequency is feasible.

In accordance with another aspect of the present invention, an apparatus for listening to radio in a portable terminal includes: a wireless transceiver for receiving a radio broadcast signal and providing a received signal strength indication (RSSI) level of a frequency; an audio processor for playing radio broadcasts; and a controller for playing radio broadcasts on a frequency selected by a user, determining a change in the RSSI value of the selected frequency and analyzing a pattern of the change, and providing a complementary service based on the analyzed pattern of the change when the radio broadcast over the selected frequency is not feasible.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
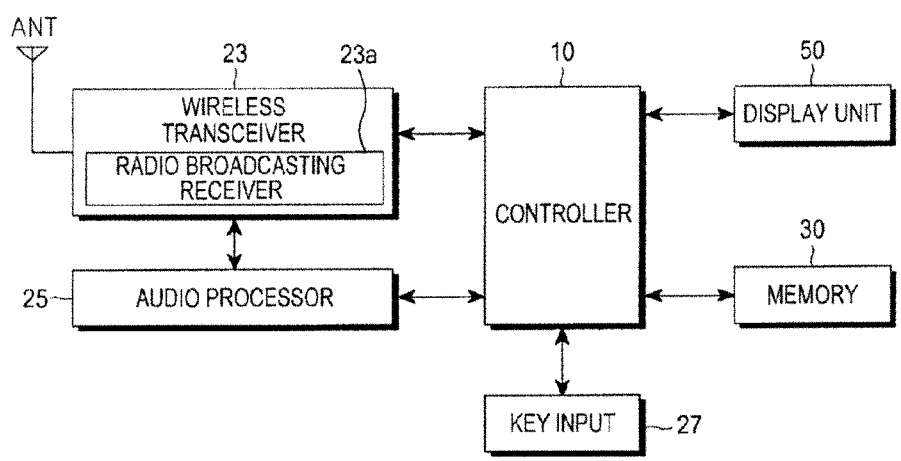
FIG. 1 is a block diagram of a portable terminal according to an embodiment of the present invention.

Reference will now be made in detail to embodiments, examples of which are illustrated in the accompanying drawings, wherein like reference numerals refer to the like elements throughout.

FIG. 1 is a block diagram of a portable terminal according to an embodiment of the present invention. The portable terminal to which the teachings of the present invention is applicable may include a portable electronic device, such as a feature phone, tablet, a smart phone operating with a mobile OS like the Windows 8®, iOS®, Android®, Bada®, etc., or a notebook operating with the Windows or Mac OS.

Referring to FIG. 1, the portable terminal according to the embodiment of the present invention includes a wireless transceiver 23 having a radio frequency (RF) unit and a modem. The RF unit includes an RF transmitter for up converting the frequency of a signal to be transmitted and amplifying the signal, and an RF receiver for low-noise amplifying a received signal and down converting the frequency of the received signal. The modem includes a transmitter for encoding and modulating the signal to be transmitted and a receiver for demodulating and decoding the signal received from the RF unit. In an embodiment of the present invention, the wireless transceiver 23 includes a radio broadcast receiver 23a. An antenna ANT of the wireless transceiver 23 may be shared with the radio broadcast receiver 23a, or a separate antenna (not shown) may be added for the radio broadcast receiver 23a. For example, the antenna of the radio broadcast receiver 23a may be an exterior speaker SPK, such as an earphone.

The radio broadcast receiver 23a receives a radio broadcast signal on a radio frequency selected (tuned) by a user under the control of a controller 10 and outputs it to the controller 10 or an audio processor 25. Then, the controller 10 provides a function to allow the user to listen to the radio on the corresponding frequency.

The radio broadcast receiver 23a outputs to the controller 10 a value of a received signal strength indication (RSSI) of the received radio broadcast signal on the frequency selected by the user, and the controller 10 analyzes a pattern of change in the value of the RSSI of the frequency.

An audio processor 25 may constitute a codec including a data codec and an audio codec. The data codec processes e.g., packet data, and the audio codec processes e.g., sound and multimedia files. The audio processor 25 performs a function of converting digital signals into analog signals and reproducing the analog signals with the audio codec, or converting analog signals input through a microphone to digital audio signals with the audio codec and transmitting them to the modem. The audio codec may be separately included in the portable terminal, or may be incorporated into a controller 10 of the portable terminal.

Using the audio processor 25, the controller 10 controls to process the radio broadcast signal received through the radio broadcast receiver 23a and output the process outcome through the speaker SPK.

A key input unit 27 may include keys for entering alphanumeric information and function keys for establishing various functions, or a touch pad. If a display unit 50 is implemented with a touch screen using capacitive sensing or pressure sensing technology, the key input unit 27 may include only a predetermined minimum number of keys, and the display unit 50 may replace some key functions.

Using the key input unit 27, the user may select a radio broadcasting frequency he/she desires to listen.

A memory 30 may consist of a program memory and a data memory, and the program memory stores a program to control general operations of the portable terminal. The memory 30 may further include an external memory, such as compact flash (CF), secure digital (SD), micro secure digital (Micro-SD), mini secure digital (Mini-SD), extreme digital (xD), memory stick, and the like. The memory 230 may also include a disc, such as hard disc drive (HDD), solid state disc (SSD), and the like.

The memory 30 stores at least one of reproducible multimedia files (e.g., video, music, or photo files) in case of the portable terminal being located in a (temporary or permanent) shadow region of radio frequencies.

The display unit 50 may be comprised of a liquid crystal display (LCD) or organic light emitting diodes (OLEDs, e.g., PMOLEDs or AMOLEDs), and outputs different display information generated in the portable terminal. The display unit 50 may operate as an input unit together with the key input unit 27 to control the portable terminal by including e.g., a capacitive or pressure sensitive touch screen. The display unit 50 replaces (or uses) the key input unit 27 to provide for the user the function of selecting the radio broadcasting frequency for listening.

The controller 10 controls general operations of the portable terminal, and may convert and control the operations of the portable terminal according to the user's input entered through the key input unit 27 or the display unit 50. The controller 10 provides a method of listening to radio in the portable terminal by performing steps of receiving and playing radio broadcasts on a frequency selected by a user, determining a change in the value of a received signal strength indication (RSSI) of the selected frequency and analyzing a pattern of the change; and providing a complementary service that complements the played radio broadcasts based on the analyzed pattern of the change when the radio broadcast over the selected frequency is not feasible or invalid when the RSSI of the selected frequency changes.

It will be appreciated that devices, such as Bluetooth modules, camera modules, GPS modules, Wi-Fi modules, proximity sensors, digital media broadcasting (DMB) receivers, etc., not currently shown in the block diagram of FIG. 1 may be included in the portable terminal and provide respective functions.

Figure 2:
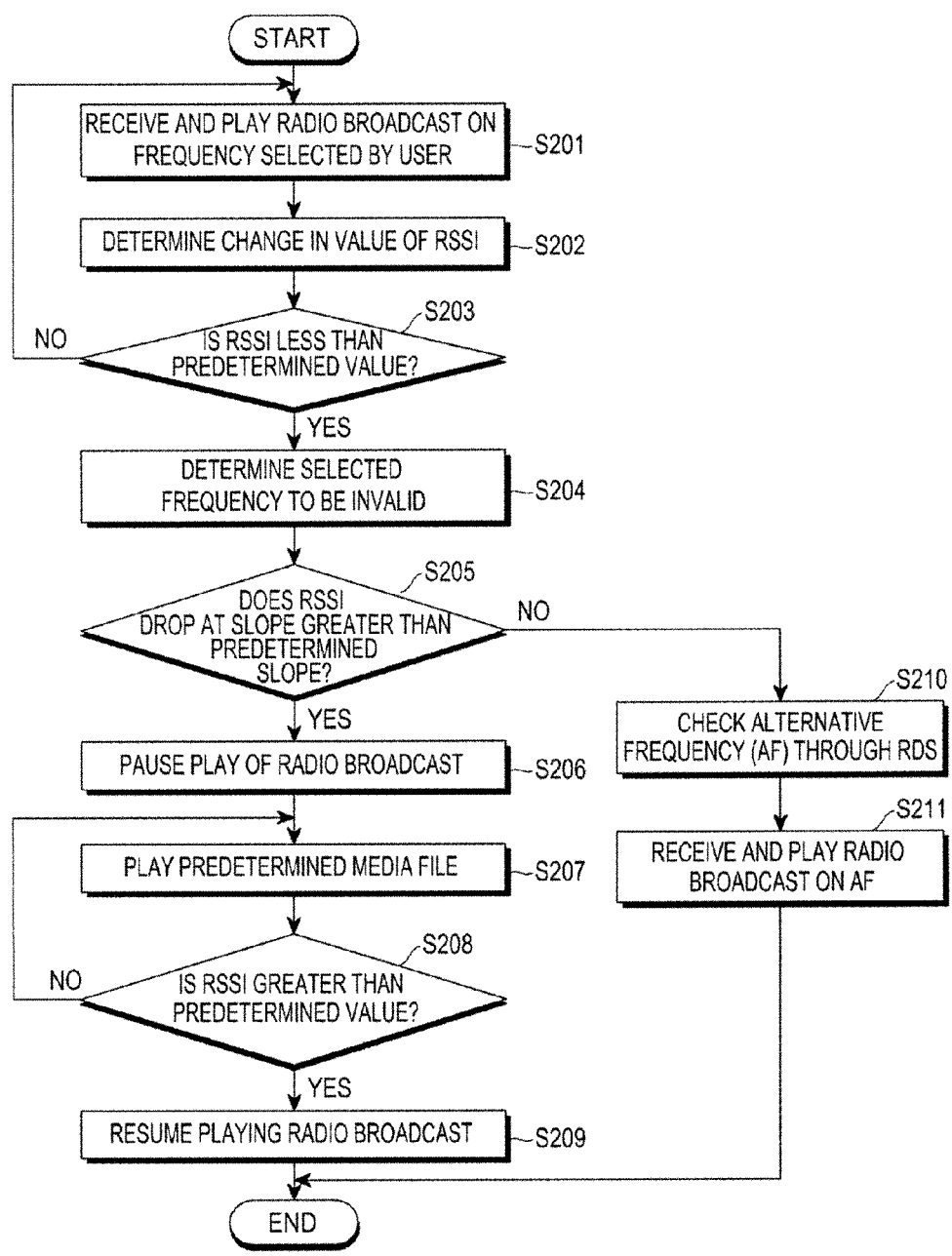
FIG. 2 is a flowchart of a method of listening to radio according to an embodiment of the present invention.
Figure 3A:
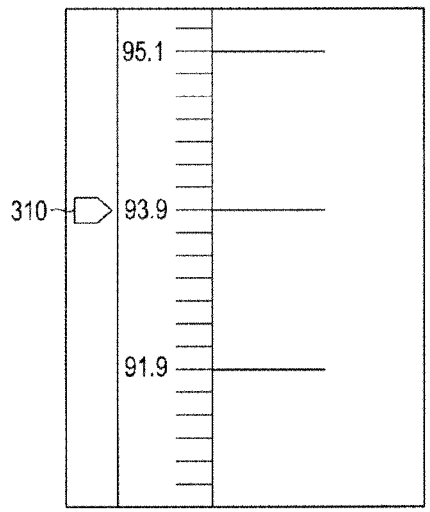
FIGS. 3A, 3B and 3C are a first diagram related to the method of listening to radio according to an embodiment of the present invention.
Figure 3B:
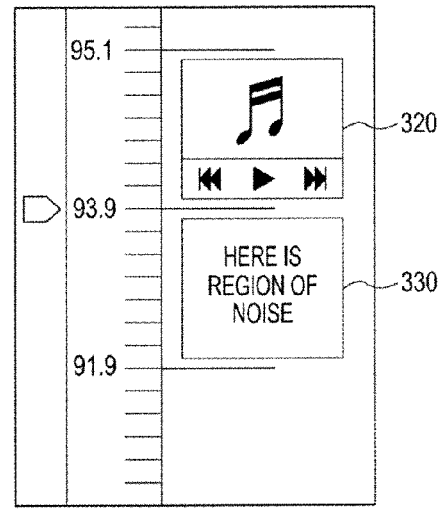
Figure 3C:
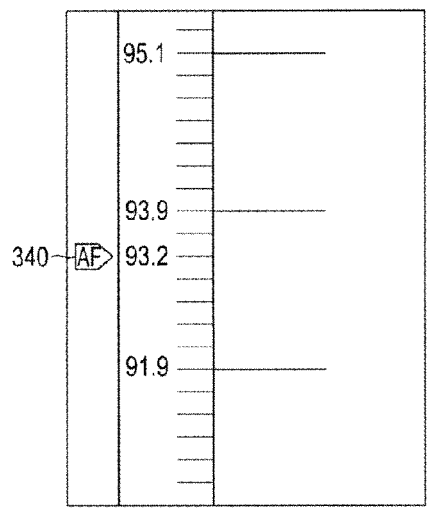
Figure 4A:
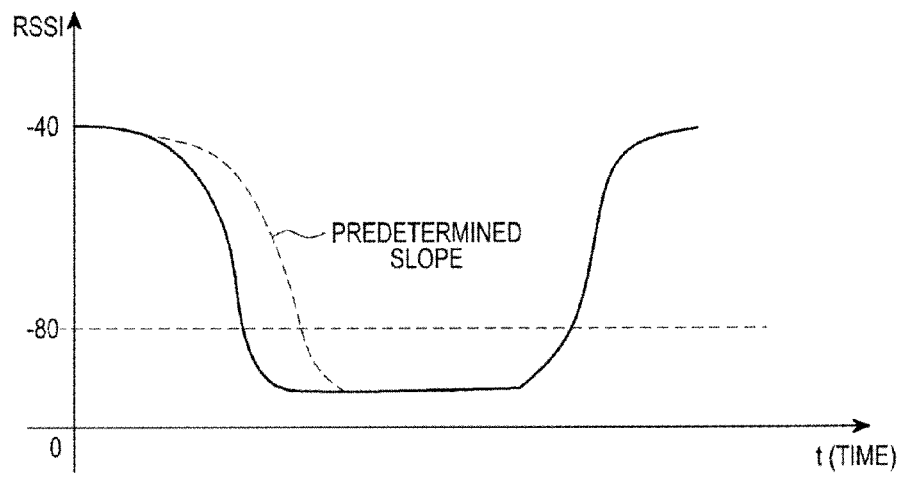
FIGS. 4A and 4B are a second diagram related to the method of listening to radio according to an embodiment of the present invention.
Figure 4B:
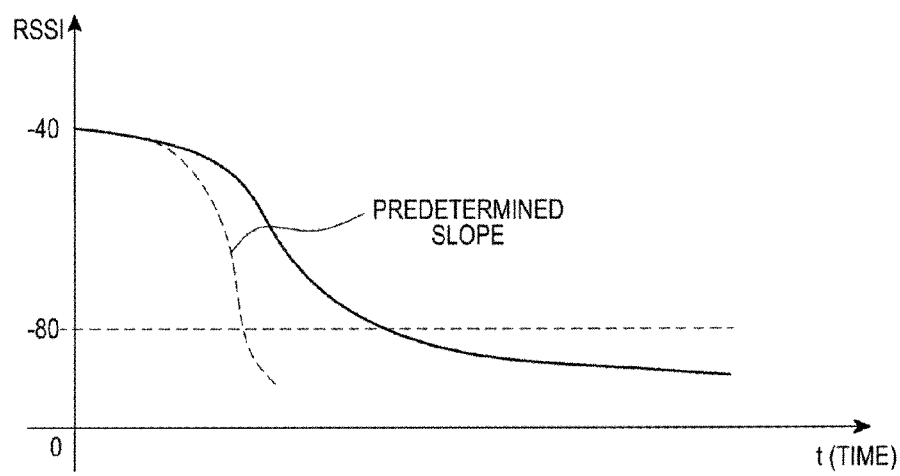

FIG. 2 is a flowchart of a method of listening to radio according to an embodiment of the present invention, and FIGS. 3 and 4 are first and second diagrams related to the method of listening to the radio broadcasts, respectively, according to an embodiment of the present invention.

As shown, in steps S201 to S203, the controller 10 receives and plays radio broadcasts on the frequency selected by the user, and determines whether the change in the value of the RSSI of the frequency selected by the user is not greater than a predetermined value.

As shown in (a) of FIG. 3, the user may run a menu or an application for listening to radio and then may request the radio listening by selecting a radio broadcasting frequency to which the user wants to tune by adjusting (e.g., in a vertical direction) a frequency changing bar 310 using the key input unit 27 or the display unit 50.

The controller 10 receives radio broadcast signals on the frequency (e.g., 93.9 MHz) selected by the user through the radio broadcasting receiver 23a, and controls to process the received radio broadcast signals for output via the audio processor 25.

While the radio broadcast is played, the controller 10 determines whether the value of the RSSI of the frequency selected by the user (i.e., the listening frequency) is changed.

The values of the RSSI of the radio broadcast signals are generally in the range of −40 to −60 dBm (which is changeable). If the value has less than −80 dBm, normal radio listening is not possible. For example, assuming that radio listening is not possible under −80 dBm, frequencies having values of the RSSI in the range of −40 to −79 dBm are designated as valid frequencies and frequencies having values of the RSSI less than −80 dBm as invalid frequencies.

In the process of determining the pattern of change in the value of the RSSI or the RSSI level, the controller 10 determines whether the frequency selected by the user (e.g., the listening frequency) is the valid frequency or invalid frequency when the value of the RSSI received from the radio broadcasting receiver 23a is changed to less than the predetermined value (e.g., −80 dBm).

On the other hand, the controller 10 determines how the value of the RSSI of the listening frequency is changed (or varied) in time at an interval of a predetermined time (e.g., 5 seconds), and controls to make a database (DB) of the pattern of the change and store the DB in the memory 30 for later use. The controller 10 may check the change in the value of the RSSI in time at a later time, and determine a falling rate (e.g., a slope) of the RSSI in time.

In step S204, if determining that the value of the RSSI of the frequency selected by the user (e.g., the listening frequency) is less than the predetermined value (e.g., −80 dBm), the controller 10 determines the selected frequency to be the invalid frequency.

In the embodiment of the present invention, since the predetermined value is assumed to be −80 dBm and radio listening is impossible if the value of the RSSI has less than −80 dBm, then the frequency in question is determined to be the invalid frequency. It will be obvious to one of ordinary skilled people that the predetermined value based on which to determine whether the frequency is valid or invalid may be changeable.

In step S205, the controller 10 determines whether the RSSI of the frequency selected by the user (e.g., listening frequency) has dropped at a slope greater than a predetermined slope.

In the method of the present invention, a complementary service is provided in case of uneasy radio listening at the listening frequency due to the drop of the value of the RSSI. To this end, the controller 10 determines the pattern of how the RSSI drops if determining that the listening frequency is invalid when the RSSI drops, and provides the complementary service depending on the pattern.

Referring to (a) and (b) of FIG. 4, for example, the RSSI of the frequency selected by the user (e.g., the listening frequency) may be changed to a predetermined value (−80 dBm)

at a slope greater than a predetermined slope, as shown in (a) of FIG. 4, or at a slope less than the predetermined slope, as shown in (b) of FIG. 4.

As shown in (a) of FIG. 4, if the RSSI of the frequency selected by the user (e.g., the listening frequency) may be rapidly changed to the predetermined value (−80 dBm) within a short time, in the embodiment of the present invention the portable terminal is assumed to have entered into a temporary shadow region, such as train tunnels, vehicle tunnels, etc.

On the contrary, as shown in (b) of FIG. 4, if the RSSI of the frequency selected by the user (e.g., the listening frequency) may be slowly changed to the predetermined value (−80 dBm), in the embodiment of the present invention the portable terminal is assumed to have entered into a permanent shadow region, such as subway tunnels, underground, etc.

In the following description, steps S206 to S209 relate to an embodiment of the portable terminal having entered into the temporary shadow region (or location), and steps S210 and S211 relate to an embodiment of the portable terminal having entered into the permanent shadow region (or location).

In steps S206 and S207, the controller 10 temporally stops the radio broadcast and controls to play a predetermined multimedia file.

As described above, if determining that the portable terminal has entered into the temporary show region (or location), the controller 10 controls to play the predetermined multimedia file, as represented by 320 in (b) of FIG. 3. Through the playing of the predetermined multimedia file, discomfort to the user over the noise from the radio broadcasting in the shadow region may be minimized.

For example, if the user traveling by train, listening to radio enters into a tunnel, the user may temporarily enjoy the predetermined multimedia file instead of listening to the noise.

In an alternate embodiment of the present invention, a guide message may be provided for the user in lieu of the multimedia file, as represented by 330 in (b) of FIG. 3. With the guide message, the user can be informed of the reason for the pause of the radio broadcast and the play of the multimedia file.

In steps S208 and S209, the controller 10 checks again the value of the RSSI of the frequency corresponding to the paused radio broadcast later and if determining that the frequency is valid, stops playing the predetermined multimedia file and receives and resumes playing broadcast signals at the frequency corresponding to the paused radio broadcast.

As described above, steps S206 to S209 relate to an embodiment of the portable terminal having entered into the temporary shadow region. As shown in (a) of FIG. 4, even if the RSSI drops rapidly compared to the predetermined slope, thus causing the predetermined multimedia file to be played, after a while it is likely to be increased again.

Thus, after playing the predetermined multimedia file, the controller 10 controls to keep checking through the radio broadcasting receiver 23a the value of the RSSI of the radio broadcasting frequency that was played (but now paused) before playing the predetermined multimedia file. Based on the result, if determining that the frequency in question is valid, the controller 10 controls to receive and resume playing the radio broadcast signals at the frequency through the radio broadcasting receiver 23a.

With the foregoing steps S206 to S209, conveniently, the user may enjoy the multimedia file while the user is in the tunnel with his/her portable terminal and may normally listen to the radio broadcast on the frequency selected by the user when coming out of the tunnel with his/her portable terminal.

In steps S210 and S211, when analyzing that the pattern of change in the value of RSSI of the frequency selected by the user drops at a slope less than the predetermined slope with respect to the time axis, the controller 10 controls to pause playing the radio broadcast, check through a radio data system (RDS) an alternative frequency (AF) replacing the frequency of the paused radio broadcast, receive and play radio broadcast signals on the AF. The RDS is a system for transmitting the radio broadcast (e.g., FM radio broadcast) together with an additional data signal, providing information about the AF replacing the frequency on which radio signals are being received.

As described above, steps S210 and S211 relate to an embodiment of the portable terminal permanently locating in the shadow region. In other words, as shown in (b) of FIG. 4, in the condition where the RSSI drops slowly compared to the predetermined slope, thus causing the normal radio listening to be impossible, the RSSI is more likely to keep a value less than the predetermined value (e.g., −80 dBm).

If determining the pattern of which the RSSI value of the frequency selected by the user (i.e., now paused) drops, the controller 10 checks the AF through the RDS. For example, when determining that the pattern of which the RSSI of 93.9 MHz selected by the user drops is the same as shown in (a) of FIG. 3, the controller checks through the RDS the AF (e.g., 93.2 MHz) for 93.9 MHz, as shown in (c) of FIG. 3, and controls an automatic tuning to the AF. Afterwards, the controller 10 controls to receive through the radio broadcasting receiver 23a and play radio broadcast signals on the AF (e.g., 93.2 MHz).

In an alternate embodiment, if the pattern of which the RSSI of the frequency of question drops is the same as shown in (b) of FIG. 4, rather than playing the radio broadcast on the AF, a function of playing a predetermined multimedia file may be provided for the user.

As explain above, the embodiments of the present invention thus described may provide an advantage of resolving the discomfort associated with the noise output due to the drop of the RSSI while listening to the radio.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Several embodiments have been described, but it will be understood that various modifications can be made without departing the scope of the present invention. Thus, it will be apparent to those ordinary skilled in the art that the invention is not limited to the embodiments described, but can encompass not only the appended claims but the equivalents.

What is claimed is:

1. A method comprising:
   outputting, by an electronic device, a radio broadcast carried by a radio broadcast signal, the radio broadcast signal having a first frequency;
   detecting a change in a received signal strength indication (RSSI) level of the radio broadcast signal; and
   in response to the change in the RSSI level of the radio broadcast signal, providing a first type of complementary service when a rate of the change in the RSSI level of the radio broadcast signal meets a criterion.

2. The method of claim 1, further comprising pausing the outputting of the radio broadcast in response to the change in the RSSI level of the radio broadcast signal.

3. The method of claim 1, wherein providing the first type of complementary service includes playing a media file that is stored on the electronic device.

4. The method of claim 1, wherein the criterion is met a when the rate of the change in the RSSI level is greater than a threshold rate.

5. The method of claim 1, further comprising, in response to the change in the RSSI level, providing a second type of complementary service when the rate of the change in the RSSI level fails to meet the criterion.

6. The method of claim 5, wherein providing the second type of complementary service includes identifying, through a radio data system (RDS), a second frequency for the radio broadcast, and tuning in to the radio broadcast on the second frequency.

7. A method comprising:
   outputting, by an electronic device, a radio broadcast carried by a radio broadcast signal;
   detecting a change in a received signal strength indication (RSSI) level of the radio broadcast signal;
   in response to the change, pausing the outputting of the radio broadcast and playing a media file;
   detecting whether the radio broadcast signal is valid based on a current RSSI level of the radio broadcast signal; and
   in response to the radio broadcast signal being valid, stopping the playing of the media file and resuming the outputting of the radio broadcast.

8. An apparatus comprising:
   a memory storing a media file:
   a wireless transceiver for receiving a radio broadcast signal having a first frequency and providing a received signal strength indication (RSSI) level of the radio broadcast signal; and
   a controller configured to output a radio broadcast that is carried over the radio broadcast signal, detect a change in the RSSI level of the radio broadcast signal, and, in response to the change, provide a first type of complementary service when a rate of the change in the RSSI level meets a criterion.

9. The apparatus of claim 8, wherein the controller is further configured to pause the outputting of the radio broadcast in response to the change in the RSSI level of the radio broadcast signal.

10. The apparatus of claim 8, wherein providing the first type of complementary service includes playing the media file.

11. The apparatus of claim 8, wherein the criterion is met when the rate of the change in the RSSI level is greater than a threshold rate.

12. The apparatus of claim 8, wherein the controller is further configured to, in response to the change in the RSSI level, provide a second type of complementary service when the rate of the change in the RSSI level fails to meet the criterion.

13. The apparatus of claim 12, wherein providing the second type of complementary service includes identifying, through a radio data system (RDS), a second frequency for the radio broadcast, and tuning in to the radio broadcast on the second frequency.

14. An apparatus comprising:
   a memory storing a media file;
   a wireless transceiver for receiving a radio broadcast signal having a first frequency and providing a received signal strength indication (RSSI) level of the radio broadcast signal; and
   a controller configured to:
   output a radio broadcast carried by the radio broadcast signal;
   detect a change in the RSSI level of the radio broadcast signal;
   in response to the change in the RSSI level, pause the outputting of the radio broadcast and play the media file;
   detect whether the radio broadcast signal is valid based on a current RSSI level of the radio broadcast signal; and
   in response to the radio broadcast signal being valid, stop playing the media file and resume the outputting of the radio broadcast.

* * * * *

UNITED STATES PATENT AND TRADEMARK OFFICE
CERTIFICATE OF CORRECTION

PATENT NO. : 9,008,599 B2  Page 1 of 1
APPLICATION NO. : 13/910378
DATED : April 14, 2015
INVENTOR(S) : Doo-Yong Park It is certified that error appears in the above-identified patent and that said Letters Patent is hereby corrected as shown below:

In the Claims,

Column 7, Claim 4, Lines 18-19 should read as follows:
--...is met when the...--

Column 7, Claim 8, Lines 43-44 should read as follows:
--...media file; a wireless...--

Signed and Sealed this
Twenty-first Day of July, 2015

Michelle K. Lee
*Director of the United States Patent and Trademark Office*